(12) United States Patent
Iwamoto et al.

(10) Patent No.: US 9,124,750 B2
(45) Date of Patent: Sep. 1, 2015

(54) IMAGE PROCESSING APPARATUS, AND FUNCTION EXECUTED METHOD AND FUNCTION EXECUTED PROGRAM IN THE APPARATUS

(71) Applicant: Konica Minolta Inc., Chiyoda-ku (JP)

(72) Inventors: Hiroshi Iwamoto, Toyohashi (JP); Jun Kunioka, Okazaki (JP); Takashi Sugaya, Toyokawa (JP); Yukina Hisada, Toyokawa (JP); Takeshi Hibino, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/552,804

(22) Filed: Nov. 25, 2014

(65) Prior Publication Data

US 2015/0146227 A1    May 28, 2015

(30) Foreign Application Priority Data

Nov. 28, 2013  (JP) ................................. 2013-246816

(51) Int. Cl.
| | |
|---|---|
| *G06F 15/00* | (2006.01) |
| *G06F 3/12* | (2006.01) |
| *G06K 1/00* | (2006.01) |
| *H04N 1/00* | (2006.01) |

(52) U.S. Cl.
CPC .......... *H04N 1/00925* (2013.01); *G06F 3/1205* (2013.01); *G06F 3/1239* (2013.01); *H04N 2201/0094* (2013.01)

(58) Field of Classification Search
CPC ....................... G06F 3/1205; H04N 2201/0094
USPC ................................ 358/1.1, 1.13, 1.14, 1.15
See application file for complete search history.

(56) References Cited

U.S. PATENT DOCUMENTS

| | | | |
|---|---|---|---|
| 8,400,530 B2 * | 3/2013 | Ikeda et al. .............. 348/231.99 |
| 8,922,806 B2 * | 12/2014 | Osaki ........................... 358/1.14 |
| 2014/0108263 A1 * | 4/2014 | Ortiz et al. ..................... 705/71 |

FOREIGN PATENT DOCUMENTS

| | | |
|---|---|---|
| JP | 10-149061 A | 6/1998 |
| JP | 2001-285561 A | 10/2001 |
| JP | 2004-48165 A | 2/2004 |

* cited by examiner

*Primary Examiner* — Douglas Tran
(74) *Attorney, Agent, or Firm* — Buchanan Ingersoll & Rooney PC

(57) ABSTRACT

An image processing apparatus includes: a user identification unit that identifies a user of the apparatus; a registration determination unit that determines whether the settings required for using a function of the apparatus are registered in a user registration unit when a user issues an instruction to execute the function, the settings being related to the user having issued the instruction, the user registration unit being capable of registering settings for each user with respect to setting items including items required for using the function and arbitrary items; a first execution unit that executes the function when the registration determination unit determines that the settings required for using the function are registered; and a second execution unit that performs a predetermined operation other than execution of the function when the registration determination unit determines that the settings required for using the function are not registered.

18 Claims, 12 Drawing Sheets

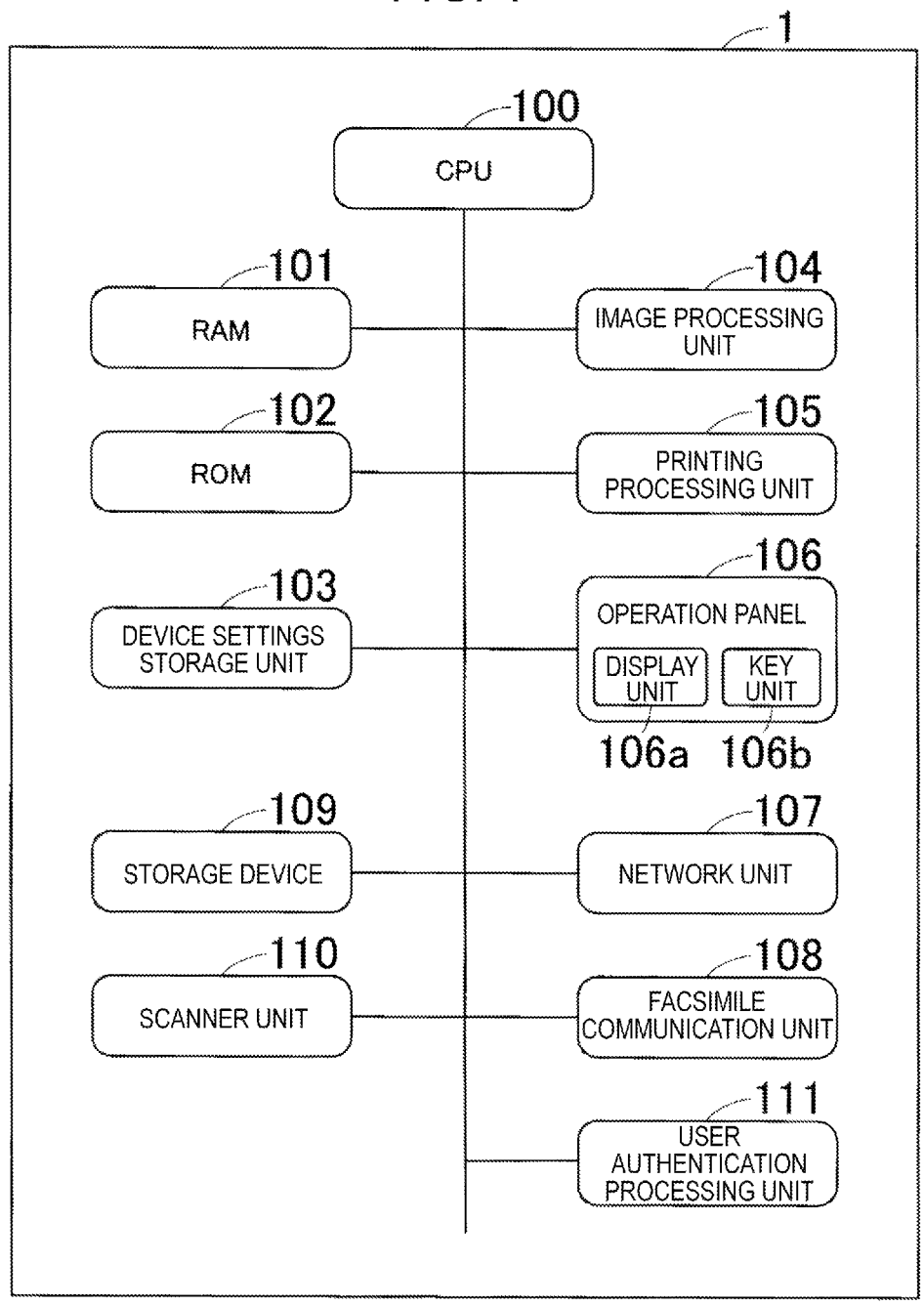

FIG. 2

| USER SETTINGS INFORMATION | USER SETTINGS REGISTRATION | EXECUTION OF FACSIMILE COMMUNICATION RESULT REPORT TRANSMISSION FUNCTION | EXECUTION OF ScantoHome FUNCTION | EXECUTION OF COPYING |
|---|---|---|---|---|
| USER IDENTIFIER | ◯(1) | ◯ | ◯ | ◯ |
| PASSWORD | ◯(1) | ◯ | ◯ | ◯ |
| MAIL ADDRESS | × | ◯(2) | × | × |
| ScantoHome TRANSMISSION TYPE (SUCH AS SMB OR EMAIL) | × | × | ◯(2) | × |
| ScantoHome TRANSMISSION DESTINATION (SMB FILE PATH) | × | × | ◯(2) | × |
| DEFAULT VALUE OF COPY DOCUMENT SIZE | × | × | × | ◯(3) |

◯ : SETTING REQUIRED    × : SETTING NOT REQUIRED

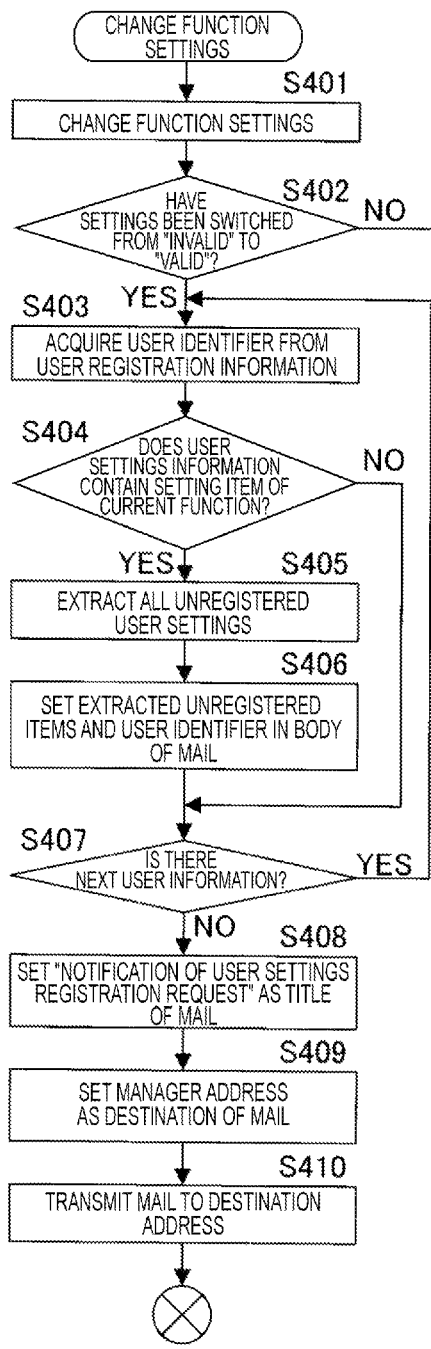

FIG. 9

| USER SETTINGS INFORMATION | SET VALUE | SET VALUE | SET VALUE | SET VALUE |
|---|---|---|---|---|
| USER IDENTIFIER | 001 | 002 | 003 | 004 |
| PASSWORD | xxxx | Yyyy | zzzz | Kkkkk |
| MAIL ADDRESS | xxx@xxx.xx | | zzz@xxx.xx | |
| ... | ... | ... | ... | ... |

IMAGE PROCESSING APPARATUS, AND FUNCTION EXECUTED METHOD AND FUNCTION EXECUTED PROGRAM IN THE APPARATUS

The entire disclosure of Japanese Patent Application No. 2013-246816 filed on Nov. 28, 2013 including description, claims, drawings, and abstract are incorporated herein by reference in its entirety.

BACKGROUND OF THE INVENTION

1. Field of the Invention

The present invention relates to an image processing apparatus such as a multi function peripheral (MFP) that is a multifunctional digital image forming apparatus, and a functional execution method and a functional execution program in the image processing apparatus.

2. Description of the Related Art

In a conventional image processing apparatus, users are identified, and functions of the image processing apparatus are executed based on information that is set and registered for the respective users. In this manner, convenience of users is increased (JP 10-149061 A, for example).

Users are normally registered by the manager who manages the apparatus. However, an image processing apparatus has not only main functions but also functions that cooperate with peripheral devices. The functions that can be used vary depending on which peripheral device is connected to the apparatus, and user settings to be registered vary accordingly. Therefore, in practice, it is difficult for the manager to register all settings in accordance with usage statuses of users, and the load on the manager is large.

For example, there is a facsimile function to send communication result reports via e-mail. When this function is used, it is necessary to register a mail address of the user to which communication result reports are to be transmitted. Mail address registration is not necessary in using a facsimile communication function, but a mail address is required when the communication result report function is used.

Therefore, in a conventional structure, the setting items of the fundamental functions are essential requirements so that the manager can decide on a policy for user registration. User setting items other than those essential items are arbitrary items, and an unregistered item can be additionally registered when the user needs to use the corresponding function.

In a case where the setting items of the fundamental functions are the essential items while the other user setting items are arbitrary items as described above, a user is not allowed to use the functions corresponding to unregistered items before the registration is completed. Therefore, to use a new function, a user needs to request the registration manager to perform registration, which is not convenient for the user.

SUMMARY OF THE INVENTION

The present invention has been made to solve such problems, and an object of the present invention is to provide an image processing apparatus that increases convenience by eliminating the need of requesting the registration manager to perform registration when the settings required for executing a function have not been registered. Another object of the present invention is to provide a function execution method implemented in the image processing apparatus, and further provide a function execution program.

To achieve at least one of the above-mentioned objects, according to an aspect, an image processing apparatus reflecting one aspect of the present invention comprises: a user identification unit that identifies a user of the apparatus; a registration determination unit that determines whether the settings required for using a function of the apparatus are registered in a user registration unit when a user issues an instruction to execute the function, the settings being related to the user having issued the instruction to execute the function, the user registration unit being capable of registering settings for each user with respect to setting items including items required for using the function and arbitrary items; a first execution unit that executes the function when the registration determination unit determines that the settings required for using the function are registered; and a second execution unit that performs a predetermined operation other than execution of the function when the registration determination unit determines that the settings required for using the function are not registered.

To achieve at least one of the above-mentioned objects, according to an aspect, a function execution method implemented in an image processing apparatus reflecting one aspect of the present invention comprises: a user identification step of identifying a user of the image processing apparatus; a registration determination step of determining whether the settings required for using a function of the image processing apparatus are registered in a user registration unit when a user issues an instruction to execute the function, the settings being related to the user having issued the instruction to execute the function, the user registration unit being capable of registering settings for each user with respect to setting items including items required for using the function and arbitrary items; a first execution step of executing the function when the registration determination step determines that the settings required for using the function are registered; and a second execution step of performing a predetermined operation other than execution of the function when the registration determination step determines that the settings required for using the function are not registered.

To achieve at least one of the above-mentioned objects, according to an aspect, a non-transitory recording medium storing a computer readable function execution program reflecting one aspect of the present invention causes a computer of an image processing apparatus to carry out: a user identification step of identifying a user of the image processing apparatus; a registration determination step of determining whether the settings required for using a function of the image processing apparatus are registered in a user registration unit when a user issues an instruction to execute the function, the settings being related to the user having issued the instruction to execute the function, the user registration unit being capable of registering settings for each user with respect to setting items including items required for using the function and arbitrary items; a first execution step of executing the function when the registration determination step determines that the settings required for using the function are registered; and a second execution step of performing a predetermined operation other than execution of the function when the registration determination step determines that the settings required for using the function are not registered.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 1 is a block diagram showing the fundamental structure of an image processing apparatus according to an embodiment of the present invention;

FIG. 2 is a list of user settings information;

FIG. 7A is a flowchart showing yet another example operation to be performed by the second execution unit;

FIG. 7B is a diagram showing the contents of an electronic mail transmitted to the user settings registration manager;

FIG. 9 is a list of user settings information;

DESCRIPTION OF THE PREFERRED EMBODIMENTS

Figure 3:
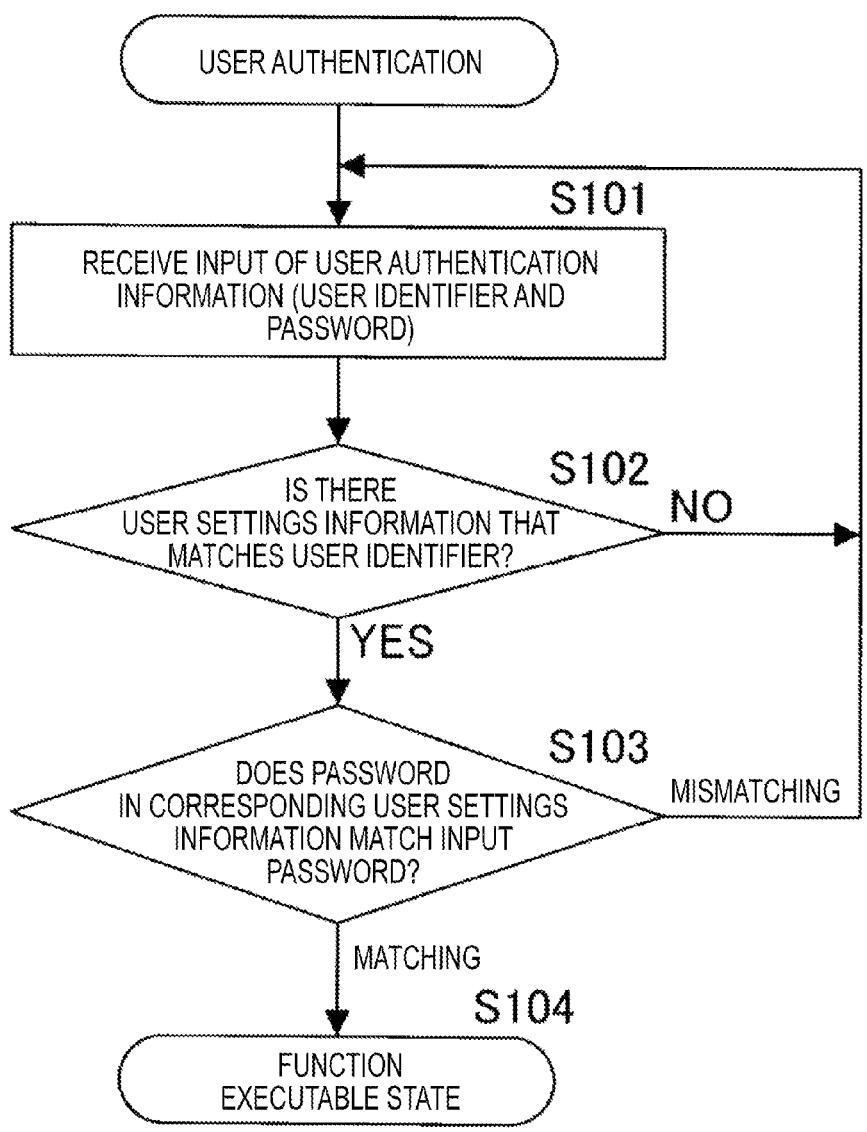
FIG. 3 is a flowchart of a user authentication process to be performed by the image processing apparatus when a user using the image processing apparatus logs on the image processing apparatus.

Hereinafter, an embodiment of the present invention will be described with reference to the drawings. However, the scope of the invention is not limited to the illustrated examples.

The following is a description of embodiments of the present invention, with reference to the accompanying drawings.

FIG. 1 is a block diagram showing the fundamental structure of an image processing apparatus 1 according to an embodiment of the present invention. In this embodiment, the above described MFP, which is a multifunctional digital image forming apparatus having a copying function, a printing function, a scanning function, and the like, is used as the image processing apparatus.

The image processing apparatus 1 includes a CPU 100, a RAM 101, a ROM 102, a device settings storage unit 103, an image processing unit 104, a printing processing unit 105, an operation panel 106, a network unit 107, a facsimile communication unit 108, a storage device 109, a scanner unit 110, and a user authentication processing unit 111.

The CPU 100 collectively controls the entire image processing apparatus 1, and operates by executing an operation program stored in the ROM 102 or the like. Specifically, the CPU 100 not only executes the basic functions of the image processing apparatus 1 such as copying, printing, and scanning, but also performs control such as switching of operations in accordance with a status of registered settings for a user to use the functions of the image processing apparatus in this embodiment. The details of the control will be described later.

The RAM 101 is a memory that provides a work area when the CPU 100 executes the operation program, and the ROM 102 stores the operation program of the CPU 100 and other data.

The device settings storage unit 103 stores the settings of the apparatus, such as the settings of the entire apparatus to be used in determining whether to allow a user to use the functions of the image processing apparatus 1, for example.

The image processing unit 104 performs image processing on the image data of a document or the like read by the scanner unit 110 when the image data is printed out. The printing processing unit 105 prints out the image data of a document read by the scanner unit 110, print data transmitted from an external terminal device, or the like.

The operation panel 106 is a user interface for a user to operate or for displaying a message to a user, conditions of the apparatus, or the like. The operation panel 106 includes a display unit 106a formed with a liquid crystal display device or the like having a touch panel, and a key unit 106b including hardware keys such as a start key, a stop key, and a numeric keypad.

The network unit 107 performs network protocol processing with an external device such as a user terminal via a network.

The facsimile communication unit 108 transmits the image data of a document read by the scanner unit 110, for example, to a facsimile apparatus at the other end via a facsimile network, or receives a facsimile document from an apparatus of the other end.

The storage device 109 is formed with a nonvolatile storage medium such as a hard disk device (HDD). The storage device 109 stores various kinds of data, and manages and stores image data folders and the like. In this embodiment, a user identifier and a password for logging on the image processing apparatus 1, and settings information and the like for using the functions of the image processing apparatus 1 are registered and stored for each user. The user identifier, the password, and the settings information for each user are registered by a user settings registration manager who is also the device manager.

The scanner unit 110 reads an image of a document, and converts the image into image data that is electronic data.

The user authentication processing unit 111 performs user authentication based on an identifier and a password that are input by a user when the user logs on the image processing apparatus 1. Alternatively, user authentication may be performed by an external authentication device, and, based on a result of the authentication, the user authentication processing unit 111 may then perform final user authentication. In this case, the user identifier, the password, and the settings information and the like for using the functions of the image processing apparatus 1 may be registered in an external authentication server.

FIG. 2 is a list of user settings information registered in the storage device 109 or an external authentication server or the like. The user settings information is formed with information classified into the three types described below.

As described above, the settings information is set and registered by the user settings registration manager prior to usage by a user, and is stored into the storage device 109 of the image processing apparatus 1 or an authentication server or the like connected via a network.

(1) Settings information required at a time of user settings registration: this is the settings information required at a time of user authentication, such as a user identifier and a password. In the list in FIG. 2, this information is indicated by ○ (1).

(2) Settings information required at a time of execution of a function of the apparatus: for example, a mail address of the user is required when a facsimile communication result report transmission function of the facsimile function is executed to transmit a facsimile communication result report is transmitted via electronic mail. In addition, a transmission type and transmission destination information are the settings required when a function is executed by ScantoHome (a function to transmit a scanned image to a user by a method of a pre-registered transmission type (electronic mail, SMB (Server Message Block), FTP (File Transfer Protocol), or the like)). This is the settings information required when such a function is executed. This information is indicated by ○ (2) in the list in FIG. 2.

(3) Information not required: settings information that does not need to be registered as user settings information, since operation is performed with its default values even if the user settings information is not registered when a function is executed with default values that can be set for each user (such as document size setting for copying), instead of the default value of the apparatus. This information is indicated by ○ (3) in the list of FIG. 2.

When instructed to execute a function by a user, the image processing apparatus 1 performs different operations depending on whether user-related settings information is registered as shown in FIG. 2. The operations of the image processing apparatus 1 will be described below, with reference to flowcharts.

FIG. 3 is a flowchart of a user authentication process to be performed by the image processing apparatus 1 when a user using the image processing apparatus 1 logs on the image processing apparatus 1.

The operations shown in the flowcharts of FIG. 3 and later are preformed by the CPU 100 of the image processing apparatus 1 operating in accordance with an operation program stored in a storage medium such as the ROM 102.

When a function is executed by a user, a user authentication input screen is displayed on the operation panel 106 of the image processing apparatus 1. As the user inputs a user identifier and a password that are the user authentication information, the image processing apparatus 1 receives the user identifier and the password in step S101, and checks whether the user settings information that matches the input user identifier information is registered in the storage device 109 in step S102. In a case where the user settings information is registered in an external authentication server, the check is made through a response from the external authentication server.

In a case where there is no matching user settings information (NO in step S102), the image processing apparatus 1 displays a warning screen indicating the authentication failure, and returns to step S101 to await an input of user authentication information.

In a case where there is the matching user settings information (YES in step S102), the image processing apparatus 1 checks whether the password information registered as the user settings information matches the input password information in step S103.

In a case where the passwords do not match ("MIS-MATCHING" in step S103), the image processing apparatus 1 displays a warning screen indicating the authentication failure, and returns to step S101 to await an input of user authentication information. In a case where the passwords do match ("MATCHING" in step S103), the image processing apparatus 1 is put into a logged-on state in step S104, and becomes capable of executing functions.

Figure 4:
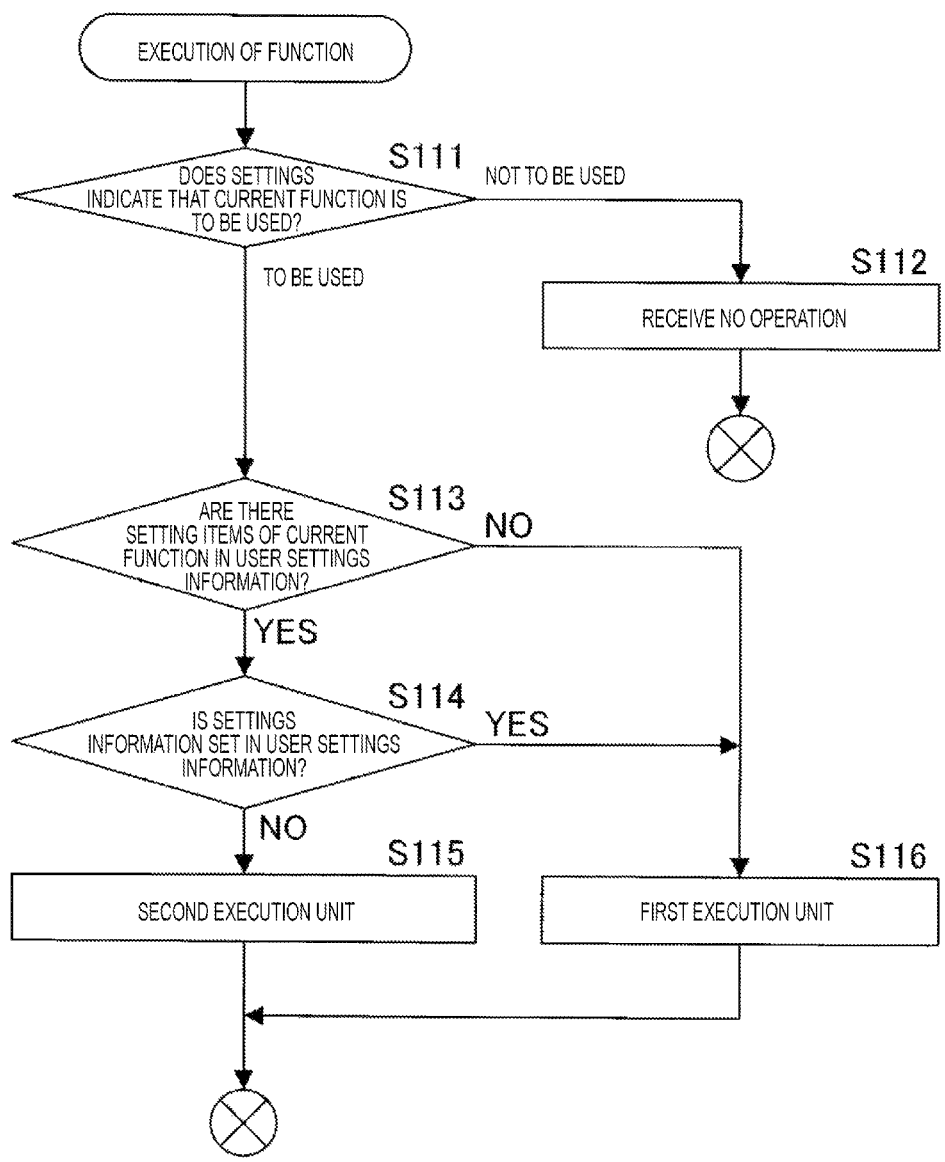
FIG. 4 is a flowchart showing the operation to be performed by the image processing apparatus when the user who has performed the log-on instructs the image processing apparatus to execute a function.

Referring now to the flowchart in FIG. 4, the operation to be performed by the image processing apparatus 1 when the user who has performed the log-on instructs the image processing apparatus 1 to execute a function is described.

When the user instructs the image processing apparatus 1 to execute a function, the image processing apparatus 1 checks the function usage setting thereof in step S111. In a case where the setting indicates "not to be used" ("NOT TO BE USED" in step S111), the image processing apparatus 1 inactivates panel display of the function or displays a warning at a time of an activating operation in step S112, so as not to receive an operation of the function.

In a case where the setting indicates "to be used" ("TO BE USED" in step S111), the image processing apparatus 1 determines whether there are setting items of the function in the settings information of the user in step S113. In a case where there are no setting items (NO in step S113), the image processing apparatus 1 performs an operation with a first execution unit in step S116, since all users can use the function. In a case where there are setting items (YES in step S113), the image processing apparatus 1 checks whether the settings information of the function is set and registered in the setting items in step S114.

In a case where the settings information is set and registered in the setting items (YES in step S114), the image processing apparatus 1 performs an operation with the first execution unit in step S116. In a case where the settings information is neither set nor registered in the setting items (NO in step S114), the image processing apparatus 1 switches to a second execution unit, and performs an operation in step S115.

The above described operation with the first execution unit is an operation performed by executing the function being used by the user, and the operation with the second execution unit is a predetermined operation that is not an operation performed by executing the function being used by the user.

Figure 5A:
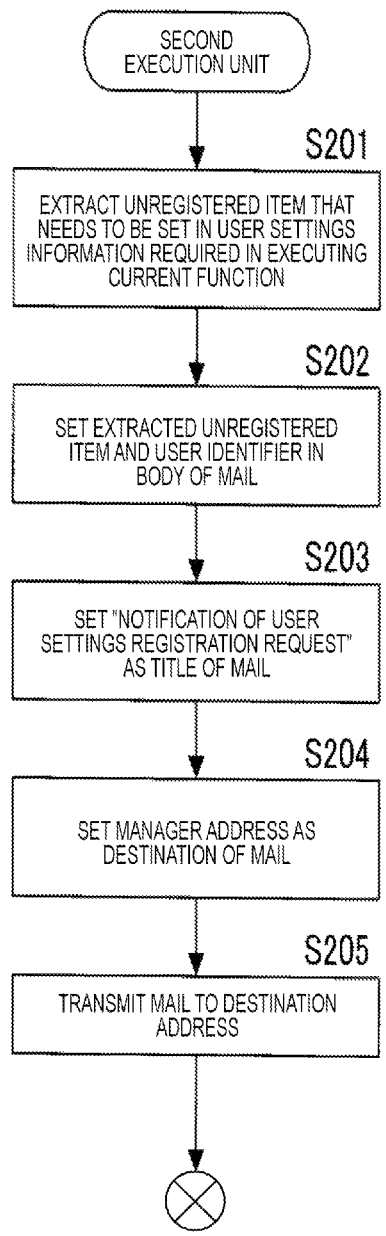
FIG. 5A is a flowchart showing an example operation to be performed by a second execution unit.
Figure 5B:
FIG. 5B is a diagram showing the contents of an electronic mail transmitted to a user settings registration manager.

Referring now to FIG. 5A and FIG. 5B, an example of the operation with the second execution unit is described. In this example, the user identifier of the user and a setting item that is necessary in performing an operation with the first execution unit but is not registered in the user settings information are transmitted, via e-mail, to a mail address (a pre-registered transmission destination) of the user settings registration manager registered beforehand in the apparatus, so as to prompt the manager to set and register the settings information related to the user.

In the flowchart shown in FIG. 5A, an unregistered setting item among the user setting items that need to be set and registered in executing the function is extracted in step S201. In step S202, the extracted setting item, the user identifier, and a message to prompt the settings registration are set in the body of an electronic mail. In step S203, a title to prompt the settings registration for the user, such as "Notification of user settings registration request", is set as the title of the mail. In step S204, the address of the user settings registration manager registered beforehand in the image processing apparatus 1 is set as the destination of the electronic mail.

In step S205, the information is transmitted to the set destination address via e-mail.

FIG. 5B shows the contents of the electronic mail to be transmitted to the user settings registration manager.

As described above, in this embodiment, the user identifier of the user and a setting item that is necessary in performing an operation with the first execution unit but is not registered in the user settings information are transmitted to the user settings registration manager via e-mail, so that the user settings registration manager can readily identify the user and the setting item to be set and registered, and smoothly perform settings registration. Accordingly, the user settings registration manager can be certainly and efficiently prompted to perform settings registration.

Figures 6A, 6B:
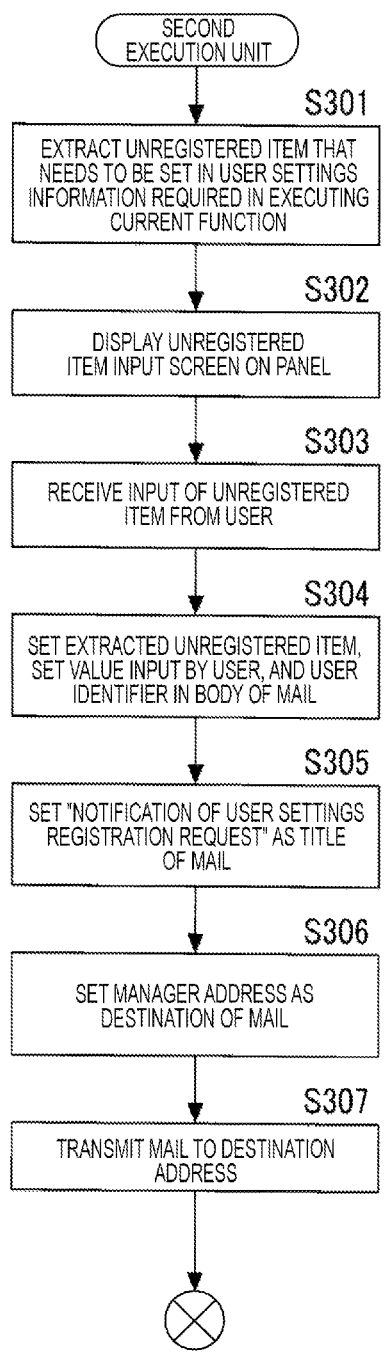
FIG. 6A is a flowchart showing another example operation to be performed by the second execution unit.
FIG. 6B is a diagram showing the contents of an electronic mail transmitted to the user settings registration manager.

FIG. 6A and FIG. 6B show another example of the operation with the second execution unit. In this example, a screen for prompting the user to input the set value of a setting item that is not registered as a setting item necessary in executing the function with the first execution unit is displayed on the display unit 106a of the operation panel 106, and the unregistered setting item, the input set value, and the user identifier of the user are transmitted, via e-mail, to a mail address of the user settings registration manager registered beforehand in the apparatus, so as to prompt the manager to set and register the settings information related to the user.

In the flowchart shown in FIG. 6A, an unregistered setting item among the user setting items that need to be set and registered in executing the function is extracted in step S301. In step S302, a set value input screen for the extracted unregistered setting item is displayed on the display unit 106a. In step S303, an input of a set value is received from the user.

In step S304, the unregistered setting item, the input set value, the user identifier, and a message to prompt the settings registration are set in the body of an electronic mail. In step S305, a title to prompt the settings registration for the user, such as "Notification of user settings registration request", is set as the title of the mail. In step S306, the address of the user settings registration manager registered beforehand in the image processing apparatus 1 is set as the destination of the electronic mail.

In step S307, the information is transmitted to the set destination address via e-mail.

FIG. 6B shows the contents of the electronic mail to be transmitted to the user settings registration manager.

As described above, in this embodiment, a screen for prompting the user to input the set value of a setting item that is not registered as a setting item necessary in executing the function with the first execution unit is displayed on the display unit 106a of the operation panel 106, and the unregistered setting item, the input set value, and the user identifier of the user are transmitted, via e-mail, to the user settings registration manager, so that the user settings registration manager can readily identify the user to be set and registered and the setting item and the set value to be registered, and smoothly perform settings registration. Accordingly, the user settings registration manager can be certainly and very efficiently prompted to perform settings registration.

FIG. 7A and FIG. 7B show yet another example of the operation with the second execution unit. In this example, when the settings are changed so that a function of the entire apparatus is switched to "to be used", setting items and users having not registered user settings information required for using the function are extracted, and the user registration manager registered beforehand in the apparatus is notified of the identification information of the unregistered users and the information about the setting items that need to be registered. In this manner, the user registration manager is prompted to register user settings information.

In the flowchart shown in FIG. 7A, the apparatus function settings are changed based on an operation performed by a manager or the like to change the apparatus function settings in step S401. In step S402, a check is made to determine whether there is a switch from "invalid" to "valid", or whether the setting for the function is changed from "not to be used by users" to "to be used by users".

If there is no switch from "invalid" to "valid" (NO in step S402), the process comes to an end. If there is a switch from "invalid" to "valid" (YES in step S402), a user identifier is acquired from the registered user information in step S403.

In step S404, a check is made to determine whether the user settings information about the user indicated by the acquired user identifier contains setting items of the function. If there are no setting items of the function (NO in step S404), the process moves on to step S407. If there are setting items of the function (YES in step S404), all the unregistered setting items are extracted in step S405. The extracted setting items, the identifier of the user, and a message to prompt settings registration are set in the body of an electronic mail in step S406, and the process then moves on to step S407.

In step S407, a check is made to determine whether there is the next user information. If there is the next user information (YES in step S407), the process returns to step S403, and steps S403 through S407 are repeated. That is, setting items of all the registered users are extracted, and the extracted setting items and the identifiers of the users are set in the body of an electronic mail. The message to prompt settings registration is set only for the first user.

In step S408, a title to prompt settings registration for the user, such as "Notification of user settings registration request", is set as the title of the mail. In step S409, the address of the user settings registration manager registered beforehand in the image processing apparatus 1 is set as the destination of the electronic mail.

In step S410, the information is transmitted to the set destination address via e-mail.

FIG. 7B shows the contents of the electronic mail to be transmitted to the user settings registration manager.

As described above, in this embodiment, when the settings are changed so that a function of the entire apparatus is switched to "to be used", setting items and users having not registered user settings information required for using the function are extracted, and the user registration manager registered beforehand in the apparatus is notified of the identification information of the unregistered users and the information about the setting items that need to be registered, so that the notified user settings registration manager can readily identify the users and setting items to be registered, and smoothly perform settings registration. Accordingly, the user settings registration manager can be certainly and efficiently prompted to perform settings registration.

Figure 8:
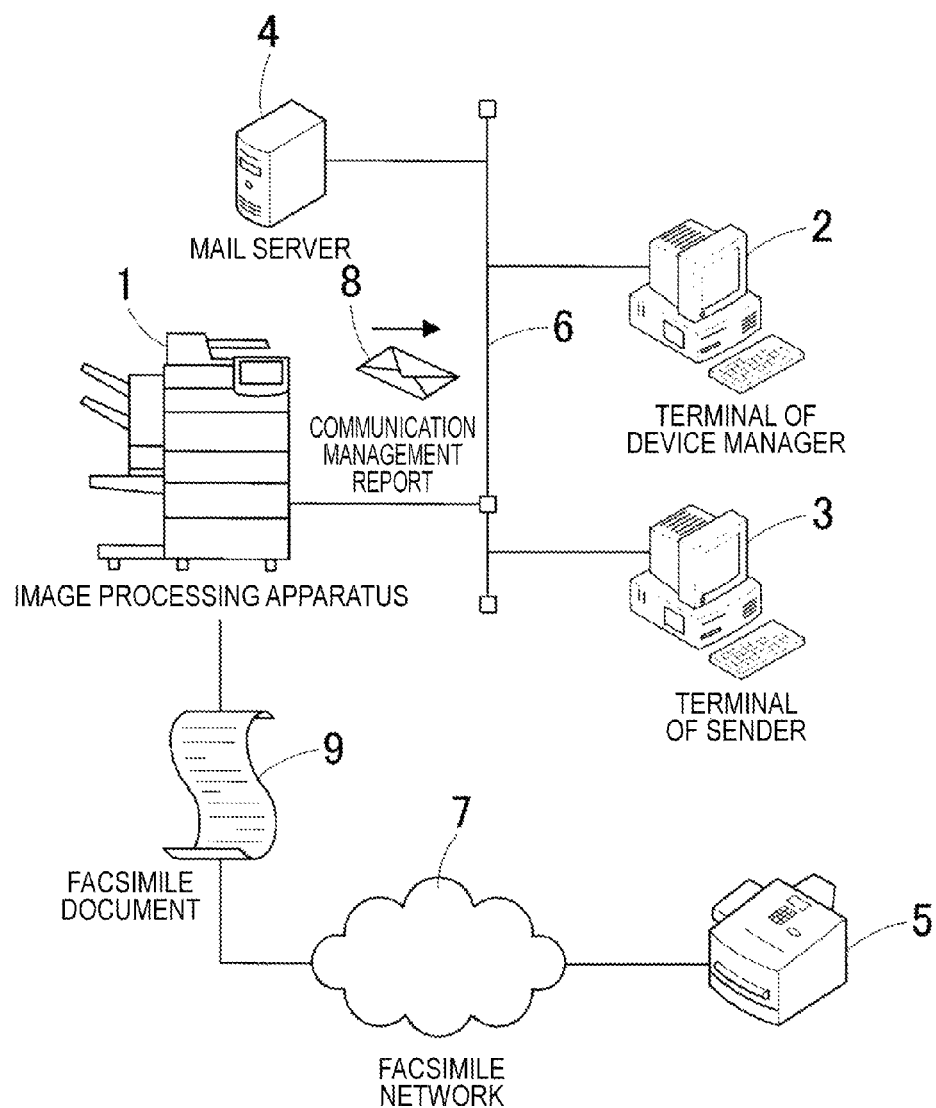
FIG. 8 is a diagram showing the configuration of a facsimile communication system in which the image processing apparatus having a facsimile communication function is used.

FIG. 8 is a diagram showing the configuration of a facsimile communication system in which the image processing apparatus 1 having a facsimile communication function is used.

In this communication system, the image processing apparatus 1, a terminal 2 of the device manager, a terminal 3 of a sender, and a mail server 4 are connected via a network 6. In addition, the image processing apparatus 1 can fax a document 9 to a facsimile apparatus 5 at the other end via a facsimile network 7. After the facsimile transmission, a communication result report 8 is transmitted to the facsimile sender via e-mail.

To use the communication result report transmission function after facsimile communication in this facsimile communication system, it is necessary to set and register a mail address as shown in a user settings information list in FIG. 9. In the example shown in FIG. 9, the users having user identifiers 001 and 003 can use the communication result report transmission function.

Figure 10:
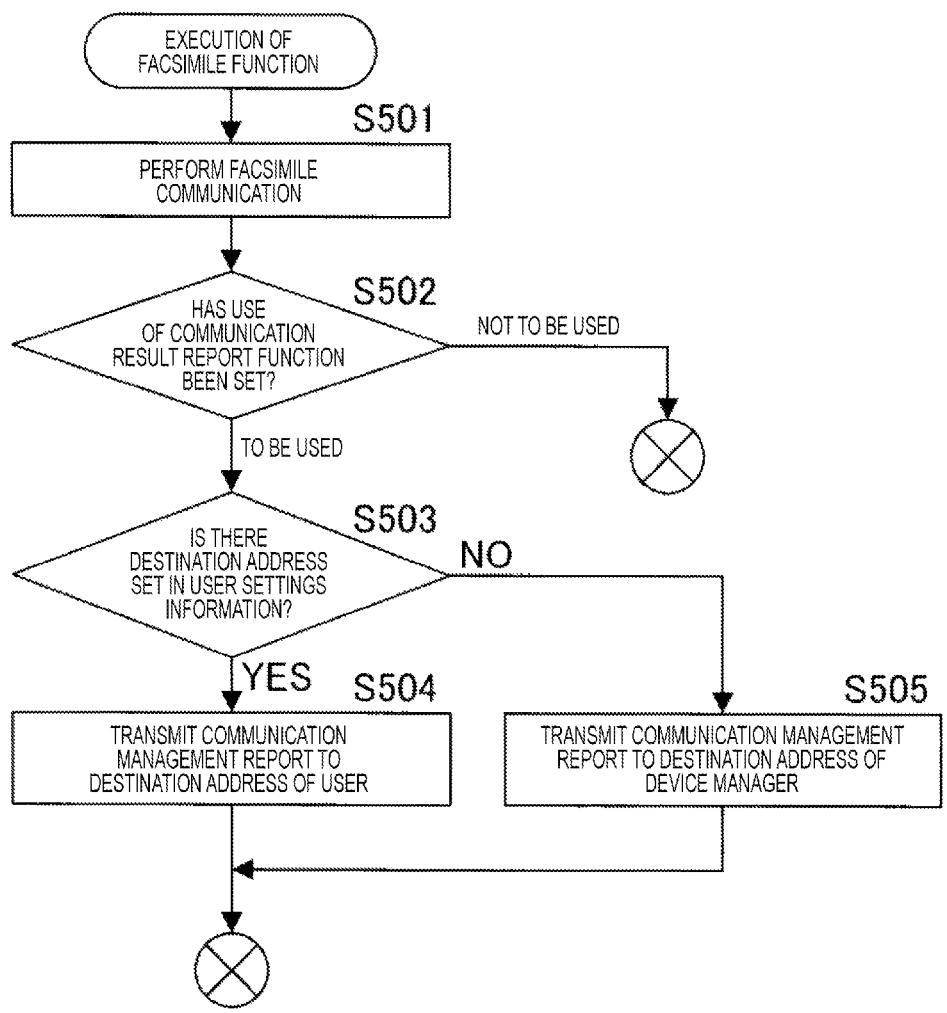
FIG. 10 is a flowchart showing the operation to be performed by the image processing apparatus at a time of facsimile communication in the system shown in FIG. 8.

Referring now to the flowchart shown in FIG. 10, the operation to be performed by the image processing apparatus at a time of facsimile communication in the facsimile communication system shown in FIG. 8 is described.

After facsimile communication is performed in step S501, the usage setting for the communication result report transmission function in the apparatus is checked in step S502. In a case where the setting indicates "not to be used" ("NOT TO BE USED" in step S502), the process comes to an end. In a case where the setting indicates "to be used" ("TO BE USED" in step S502), a check is made to determine whether an electronic mail destination address is set in the settings information about the user in step S503.

In a case where a destination address is set (YES in step S503), a communication management report (a communication result report) is transmitted to the destination address in an operation performed with the first execution unit in step S504. In a case where any destination address is not set (NO in step S503), on the other hand, a communication management report (a communication result report) is transmitted to a destination address of the device manager (the user settings registration manager) registered beforehand in the image processing apparatus 1 via e-mail in an operation performed with the second execution unit in step S505.

As described above, in a case where a destination address of a user is neither set nor registered, a communication result report is transmitted to the user settings registration manager via e-mail, and accordingly, the user settings registration manager can be prompted to set and register a mail address of the user.

Figure 11:
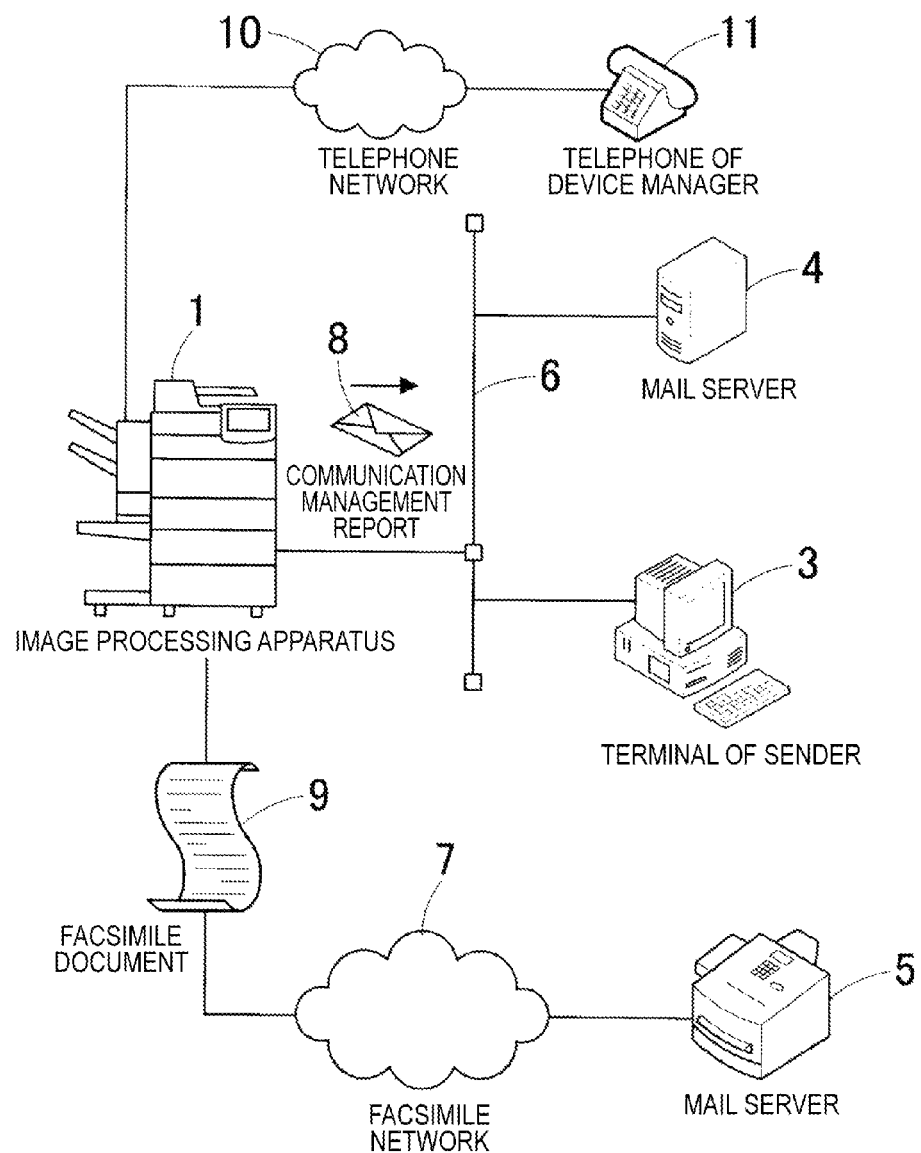
FIG. 11 is a diagram showing another example configuration of a facsimile communication system.

FIG. 11 is a diagram showing another example configuration of a facsimile communication system. This facsimile communication system has the same configuration as that shown in FIG. 8. Furthermore, in this facsimile communication system, the image processing apparatus 1 can make a phone call to a telephone 11 of the device manager via a telephone network 10.

Figure 12:
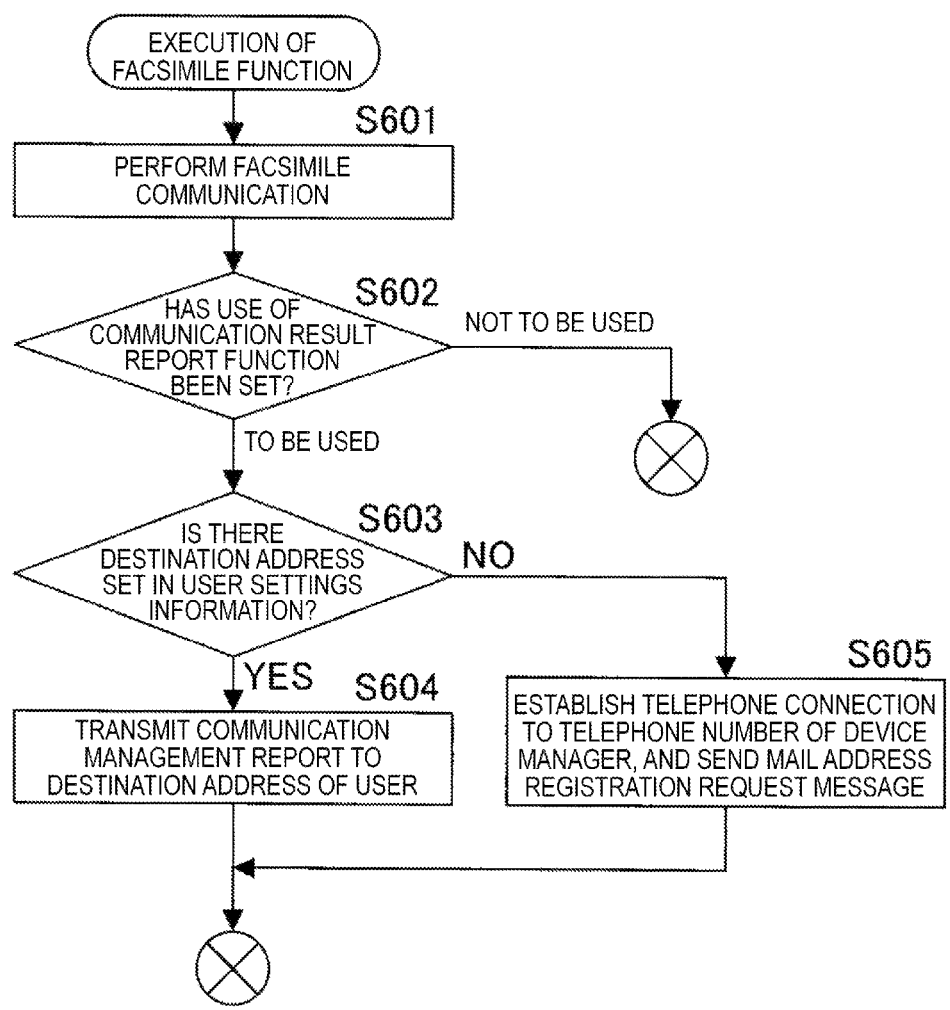
FIG. 12 is a flowchart showing the operation to be performed by the image processing apparatus at a time of facsimile communication in the system shown in FIG. 11.

Referring now to the flowchart shown in FIG. 12, the operation to be performed by the image processing apparatus at a time of facsimile communication in the facsimile communication system shown in FIG. 11 is described.

After facsimile communication is performed in step S601, the usage setting for the communication result report transmission function in the apparatus is checked in step S602. In a case where the setting indicates "not to be used" ("NOT TO BE USED" in step S602), the process comes to an end. In a case where the setting indicates "to be used" ("TO BE USED" in step S602), a check is made to determine whether an electronic mail destination address is set in the settings information about the user in step S603.

In a case where a destination address is set (YES in step S603), a communication management report (a communication result report) is transmitted to the destination address in an operation performed with the first execution unit in step S604. In a case where any destination address is not set (NO in step S603), on the other hand, a telephone connection to a telephone number of the device manager (the user settings registration manager) registered beforehand in the image processing apparatus 1 is established, and a voice message that requests mail address registration is sent in an operation performed with the second execution unit in step S605.

As described above, in a case where a destination address of a user is neither set nor registered, a voice message that requests mail address registration is sent to the user settings registration manager by telephone, and accordingly, the user settings registration manager can be prompted to set and register a mail address of the user.

In the above described embodiment, when a user issues an instruction to execute a function of the image processing apparatus, a check is made to determine whether the settings required for using the function are registered. In a case where it is determined that the required settings are registered, the function is executed. In a case where it is determined that the settings required for using the function are not registered, a predetermined operation other than execution of the function is performed. Therefore, a notification operation to prompt a user settings registration manager to register the settings for using the function is set as the predetermined operation other than execution of the function. Accordingly, the user does not need to directly request the user settings registration manager to perform settings registration, and convenience of the user is increased.

In the above described embodiment, in a case where it is determined that the settings required for using a function are not registered when a user issues an instruction to execute the function of the image processing apparatus, the user identification information of the user who has issued the function execution instruction, and the setting item information indicating unregistered setting items among the setting items required for executing the function are transmitted to the user settings registration manager who is registered in advance. Accordingly, it is possible to certainly and efficiently prompt the user settings registration manager to perform settings registration.

In the above described embodiment, in a case where it is determined that the settings required for using a function are not registered when a user issues an instruction to execute the function of the image processing apparatus, a screen for prompting the user to input a set value for an unregistered setting item among the setting items required for executing the function is displayed, and the unregistered setting item, the input set value, and the user identification information of the user are transmitted to the user settings registration manager who is registered in advance. Accordingly, it is possible to certainly and very efficiently prompt the user settings registration manager to perform settings registration.

In the above described embodiment, in a case where settings for allowing a user to use a function of the image processing apparatus are set by a setting unit that can set the settings of the apparatus as to whether to allow the user to use the function, users not having registered the settings required for using the function are extracted, and the user identification information of the extracted users and setting item information indicating the setting items required for executing the function are transmitted to the user settings registration manager who is registered in advance. Accordingly, the user settings registration manager can collectively perform necessary settings registration for the users. Furthermore, a user who is not allowed to use a set function does not need to directly request the user settings registration manager to perform settings registration, and accordingly, convenience of users is increased.

In the above described embodiment, in a case where it is determined that a mail address of a user to whom a communication result report is to be transmitted is set and registered, the communication result report as a result of facsimile communication is transmitted to the registered mail address of the user. In a case where it is determined that any mail address is neither set nor registered, the communication result report as a result of facsimile communication is transmitted to a mail address of the user settings registration manager who is registered in advance. Accordingly, it is possible to prompt the user settings registration manager to set and register the mail address of the user.

In the above described embodiment, in a case where it is determined that a mail address of a user to whom a communication result report is to be transmitted is set and registered, the communication result report as a result of facsimile communication is transmitted to the registered mail address of the user. In a case where it is determined that any mail address is neither set nor registered, a telephone call is made to a telephone number of the user settings registration manager who is registered in advance, for example. Accordingly, it is possible to prompt the user settings registration manager or the like to set and register the mail address of the user.

Further, a program for causing the CPU 100 of the image processing apparatus 1 to perform the above described processes can be provided. Such a program can be provided as a program product that is recorded in a computer-readable recording medium accompanying a computer, such as a flexible disk, a CD-ROM (Compact Disk-Read Only Memory), a ROM, a RAM, or a memory card. Alternatively, the program may be recorded in a recording medium such as an internal hard disk in a computer. The program may also be provided through downloading via a network.

A program according to an embodiment of the present invention may be designed to invoke necessary modules in a predetermined order at a predetermined time among program modules provided as part of the operating system (OS) of a computer, and cause the modules to perform processes. In this case, the modules are not included in the program, but the program cooperates with the OS to perform processes. Such a program that does not include modules is also a program according to an embodiment of the present invention.

A program according to an embodiment of the present invention may be incorporated into another program, and be provided as part of the other program. In such a case, the program does not include the modules included in the other program, and cooperates with the other program to perform processes. Such a program that is incorporated into another program is also a program according to an embodiment of the present invention.

A provided program product is installed into a program storage unit such as a hard disk, and is then executed. A program product includes a program and a recording medium in which the program is recorded.

Although the present invention has been described and illustrated in detail, it is clearly understood that the same is by way of illustrated and example only and is not to be taken by way of limitation, the scope of the present invention being interpreted by terms of the appended claims.

What is claimed is:

1. An image processing apparatus comprising:
a user identification unit configured to identify a user of the apparatus;
a registration determination unit configured to determine whether settings required for using a function of the apparatus are registered in a user registration unit when a user issues an instruction to execute the function, the settings being related to the user having issued the instruction to execute the function, the user registration unit being capable of registering settings for each user with respect to setting items including items required for using the function and arbitrary items;
a first execution unit configured to execute the function when the registration determination unit determines that the settings required for using the function are registered; and
a second execution unit configured to perform a predetermined operation other than execution of the function when the registration determination unit determines that the settings required for using the function are not registered.

2. The image processing apparatus according to claim 1, wherein the predetermined operation to be performed by the second execution unit is an operation to transmit user identification information of the user having issued the instruction to execute the function and setting item information to a pre-registered transmission destination, the setting item information indicating an unregistered item among the setting items required in execution of the function by the first execution unit.

3. The image processing apparatus according to claim 1, wherein the predetermined operation to be performed by the second execution unit is an operation to display a screen for prompting the user to input a set value for an unregistered setting item among the setting items required in execution of the function by the first execution unit, and transmit the unregistered setting item, an input set value, and user identification information of the user to a pre-registered transmission destination.

4. The image processing apparatus according to claim 1, further comprising:
a setting unit configured to create a setting in the apparatus as to whether to allow a user to use the function of the apparatus; and
an extraction unit configured to extract a user not having registered the settings required for using the function in the user registration unit, when the setting unit creates the setting to allow a user to use the function,
wherein the second execution unit transmits user identification information of the user extracted by the extraction unit and setting item information indicating the setting items required for executing the function to a pre-registered transmission destination.

5. The image processing apparatus according to claim 1, further comprising:
a facsimile communication unit configured to perform communication related to image data read from a document image via a facsimile network; and
a communication result report transmission unit configured to transmit a facsimile communication result report via electronic mail,
wherein
the setting items that can be registered in the user registration unit include a mail address of a user to which a communication result report is to be transmitted,
when the registration determination unit determines that the mail address is set and registered, the first execution unit transmits the communication result report as a result of facsimile communication to the set mail address of the user, and
when the registration determination unit determines that the mail address is neither set nor registered, the second execution unit transmits the communication result report as a result of fax communication to a pre-registered transmission destination.

6. The image processing apparatus according to claim 1, further comprising:
a facsimile communication unit configured to perform communication related to image data read from a document image via a facsimile network; and
a communication result report transmission unit configured to transmit a facsimile communication result report via electronic mail,
wherein the setting items that can be registered in the user registration unit include a mail address of a user to which a communication result report is to be transmitted, when the registration determination unit determines that the mail address is set and registered, the first execution unit transmits the communication result report as a result of facsimile communication to the set mail address of the user, and when the registration determination unit determines that the mail address is neither set nor registered, the second execution unit makes a telephone call to a predetermined telephone number, and after reception of the call, sends a voice message that requests registration of the mail address of the user.

7. A function execution method implemented in an image processing apparatus, the method comprising the steps of:
   a) identifying a user of the image processing apparatus;
   b) determining whether settings required for using a function of the image processing apparatus are registered in a user registration unit when a user issues an instruction to execute the function, the settings being related to the user having issued the instruction to execute the function, the user registration unit being capable of registering settings for each user with respect to setting items including items required for using the function and arbitrary items;
   c) executing the function when it is determined that the settings required for using the function are registered in step b); and
   d) performing a predetermined operation other than execution of the function when it is determined that the settings required for using the function are not registered in step b).

8. The function execution method implemented in an image processing apparatus according to claim 7, wherein the predetermined operation to be performed in step d) is an operation to transmit user identification information of the user having issued the instruction to execute the function and setting item information to a pre-registered transmission destination, the setting item information indicating an unregistered item among the setting items required in the execution of the function in step c).

9. The function execution method implemented in an image processing apparatus according to claim 7, wherein the predetermined operation to be performed in step d) is an operation to display a screen for prompting the user to input a set value for an unregistered setting item among the setting items required in the execution of the function in step c), and transmit the unregistered setting item, an input set value, and user identification information of the user to a pre-registered transmission destination.

10. The function execution method implemented in an image processing apparatus according to claim 7, further comprising the steps of:
    e) creating a setting in the apparatus as to whether to allow a user to use the function of the image processing apparatus; and
    f) extracting a user not having registered the settings required for using the function in the user registration unit, when the setting is created to allow a user to use the function in step e),
    wherein, in step d), user identification information of the user extracted in step f) and setting item information indicating the setting items required for executing the function are transmitted to a pre-registered transmission destination.

11. The function execution method implemented in an image processing apparatus according to claim 7, further comprising the steps of:
    g) performing communication related to image data read from a document image via a facsimile network; and
    h) transmitting a facsimile communication result report via electronic mail,
    wherein
    the setting items that can be registered in the user registration unit include a mail address of a user to which a communication result report is to be transmitted,
    when it is determined that the mail address is set and registered in step b), the communication result report as a result of facsimile communication is transmitted to the set mail address of the user in step c), and
    when it is determined that the mail address is neither set nor registered in step b), the communication result report as a result of facsimile communication is transmitted to a pre-registered transmission destination in step d).

12. The function execution method implemented in an image processing apparatus according to claim 7, further comprising the steps of:
    i) performing communication related to image data read from a document image via a facsimile network; and
    j) transmitting a facsimile communication result report via electronic mail,
    wherein
    the setting items that can be registered in the user registration unit include a mail address of a user to which a communication result report is to be transmitted,
    when it is determined that the mail address is set and registered in step b), the communication result report as a result of facsimile communication is transmitted to the set mail address of the user in step c), and
    when it is determined that the mail address is neither set nor registered in step b), a telephone call is made to a predetermined telephone number, and after reception of the call, a voice message that requests registration of the mail address of the user is sent in step d).

13. A non-transitory recording medium storing a computer readable function execution program to be executed by a computer of an image processing apparatus,
    the program causing the computer to carry out the steps of:
    a) identifying a user of the image processing apparatus;
    b) determining whether settings required for using a function of the image processing apparatus are registered in a user registration unit when a user issues an instruction to execute the function, the settings being related to the user having issued the instruction to execute the function, the user registration unit being capable of registering settings for each user with respect to setting items including items required for using the function and arbitrary items;
    c) executing the function when it is determined that the settings required for using the function are registered in step b); and
    d) performing a predetermined operation other than execution of the function when it is determined that the settings required for using the function are not registered in step b).

14. The non-transitory recording medium storing a computer readable function execution program to be executed by a computer of an image processing apparatus according to claim 13, wherein the predetermined operation to be performed in step d) is an operation to transmit user identification information of the user having issued the instruction to execute the function and setting item information to a pre-registered transmission destination, the setting item information indicating an unregistered item among the setting items required in the execution of the function in step c).

15. The non-transitory recording medium storing a computer readable function execution program to be executed by a computer of an image processing apparatus according to claim 13, wherein the predetermined operation to be performed in step d) is an operation to display a screen for prompting the user to input a set value for an unregistered setting item among the setting items required in the execution of the function in step c), and transmit the unregistered setting item, an input set value, and user identification information of the user to a pre-registered transmission destination.

16. The non-transitory recording medium storing a computer readable function execution program to be executed by a computer of an image processing apparatus according to claim 13, further causing the computer to carry out the steps of:
  e) creating a setting in the apparatus as to whether to allow a user to use the function of the image processing apparatus; and
  f) extracting a user not having registered the settings required for using the function in the user registration unit, when the setting is created to allow a user to use the function in step e),
  wherein, in step d), user identification information of the user extracted in step f) and setting item information indicating the setting items required for executing the function are transmitted to a pre-registered transmission destination.

17. The non-transitory recording medium storing a computer readable function execution program to be executed by a computer of an image processing apparatus according to claim 13, further causing the computer to carry out the steps of:
  g) performing communication related to image data read from a document image via a facsimile network; and
  h) transmitting a facsimile communication result report via electronic mail,
  wherein
  the setting items that can be registered in the user registration unit include a mail address of a user to which a communication result report is to be transmitted,
  when it is determined that the mail address is set and registered in step b), the communication result report as a result of facsimile communication is transmitted to the set mail address of the user in step c), and
  when it is determined that the mail address is neither set nor registered in step b), the communication result report as a result of facsimile communication is transmitted to a pre-registered transmission destination in step d).

18. The non-transitory recording medium storing a computer readable function execution program to be executed by a computer of an image processing apparatus according to claim 13, further causing the computer to carry out the steps of:
  i) performing communication related to image data read from a document image via a facsimile network; and
  j) transmitting a facsimile communication result report via electronic mail,
  wherein
  the setting items that can be registered in the user registration unit include a mail address of a user to which a communication result report is to be transmitted,
  when it is determined that the mail address is set and registered in step b), the communication result report as a result of facsimile communication is transmitted to the set mail address of the user in step c), and
  when it is determined that the mail address is neither set nor registered in step b), a telephone call is made to a predetermined telephone number, and after reception of the call, a voice message that requests registration of the mail address of the user is sent in step d).

* * * * *